(12) United States Patent
Sawada et al.

(10) Patent No.: US 11,367,176 B2
(45) Date of Patent: Jun. 21, 2022

(54) COMMODITY MANAGEMENT DEVICE AND COMMODITY MANAGEMENT SYSTEM

(71) Applicant: TOSHIBA TEC KABUSHIKI KAISHA, Tokyo (JP)

(72) Inventors: Takayuki Sawada, Numazu Shizuoka (JP); Tetsuya Nobuoka, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/149,315

(22) Filed: Jan. 14, 2021

(65) Prior Publication Data

US 2021/0295498 A1 Sep. 23, 2021

(30) Foreign Application Priority Data

Mar. 17, 2020 (JP) .............................. JP2020-046121

(51) Int. Cl.
| | |
|---|---|
| *G06T 7/00* | (2017.01) |
| *G06K 9/62* | (2022.01) |
| *G06T 7/70* | (2017.01) |
| *G06V 10/25* | (2022.01) |
| *G06V 10/24* | (2022.01) |
| *G06V 10/44* | (2022.01) |

(52) U.S. Cl.
CPC .......... *G06T 7/0008* (2013.01); *G06K 9/6215* (2013.01); *G06T 7/70* (2017.01); *G06V 10/242* (2022.01); *G06V 10/25* (2022.01); *G06V 10/454* (2022.01); *G06T 2207/30232* (2013.01); *G06T 2207/30242* (2013.01); *G06V 2201/07* (2022.01)

(58) Field of Classification Search
CPC ..................... G06T 7/0008; G06T 7/70; G06T 2207/30232; G06T 2207/30242; G06K 9/6215; G06K 9/6267; G06V 10/242; G06V 10/25; G06V 10/454; G06V 2201/07; G06V 20/52
USPC ......................................................... 382/103
See application file for complete search history.

(56) References Cited

U.S. PATENT DOCUMENTS

| | | | |
|---|---|---|---|
| 2019/0172039 A1* | 6/2019 | Kambara | G06Q 20/208 |
| 2020/0202177 A1* | 6/2020 | Buibas | G01S 7/4816 |
| 2021/0090294 A1* | 3/2021 | Ramos | H04N 5/23206 |

OTHER PUBLICATIONS

Higa, Kyota, and Kota Iwamoto. "Robust estimation of product amount on store shelves from a surveillance camera for improving on-shelf availability." 2018 IEEE International Conference on Imaging Systems and Techniques (IST). IEEE, 2018. (Year: 2018).*

* cited by examiner

*Primary Examiner* — Amandeep Saini
(74) *Attorney, Agent, or Firm* — Kim & Stewart LLP

(57) ABSTRACT

A commodity management device includes a camera interface circuit connectable to a camera to capture an image of one of commodities arranged in a row along a first direction from a back plate to a front of the shelf. The device includes a sensor interface circuit connectable to a sensor measuring a distance to the commodities in the row. A processor is configured to detect a change in the distance measured by the sensor, identify the commodities based on the image, then acquire a thickness of each commodity in the row, and calculate the number of the commodities removed from the shelf based on the distance change and the thickness of the commodities.

20 Claims, 14 Drawing Sheets

FIG. 2

| Area ID | Distance Sensor ID | Camera ID | Commodity Code | Thickness Information |
|---|---|---|---|---|

121

COMMODITY MANAGEMENT DEVICE AND COMMODITY MANAGEMENT SYSTEM

CROSS-REFERENCE TO RELATED APPLICATIONS

This application is based upon and claims the benefit of priority from Japanese Patent Application No. 2020-046121, filed on Mar. 17, 2020, the entire contents of which are incorporated herein by reference.

FIELD

Embodiments described herein relate generally to a commodity management device and a commodity management system.

BACKGROUND

In recent years, cashierless stores that do not require product registration via a checkout lane have appeared. In such stores, when a customer takes a commodity from a shelf, and then the commodity is automatically registered to the customer's purchase list. When the customer leaves the store, checkout procedures are performed based on the purchase list.

In order to achieve such cashierless stores, it is necessary to identify when commodities are taken from a commodity display shelf, or the like, and detect the number of the removed commodities.

BRIEF DESCRIPTION OF THE DRAWINGS

FIG. 2 is a diagram illustrating a record of an association table stored in a commodity management device according to an embodiment.

DETAILED DESCRIPTION

In general, a commodity management device for managing commodities on a display includes a camera interface circuit connectable to a camera that is configured to capture an image of a first commodity in a commodity row that is arranged along a first direction from a back plate of a shelf to a front of the shelf. The device includes a sensor interface circuit that is connectable to a sensor that is attached to the back plate. The sensor is configured to measure a distance from the back plate to a second commodity in the commodity row. A processor is configured to detect a change in the distance measured by the sensor, identify the first commodity based on the captured image and then acquire a thickness, in the first direction, of the first commodity based on the identification of the first commodity. The processor is configured to calculate the number of commodities removed from the shelf based on the detected change in distance and the thickness of the first commodity.

Hereinafter, example embodiments of a commodity management device and a commodity management system capable of identifying one or more commodities taken from a commodity display shelf and also detecting the number of the taken commodities will be described with reference to the drawings.

Figure 1:
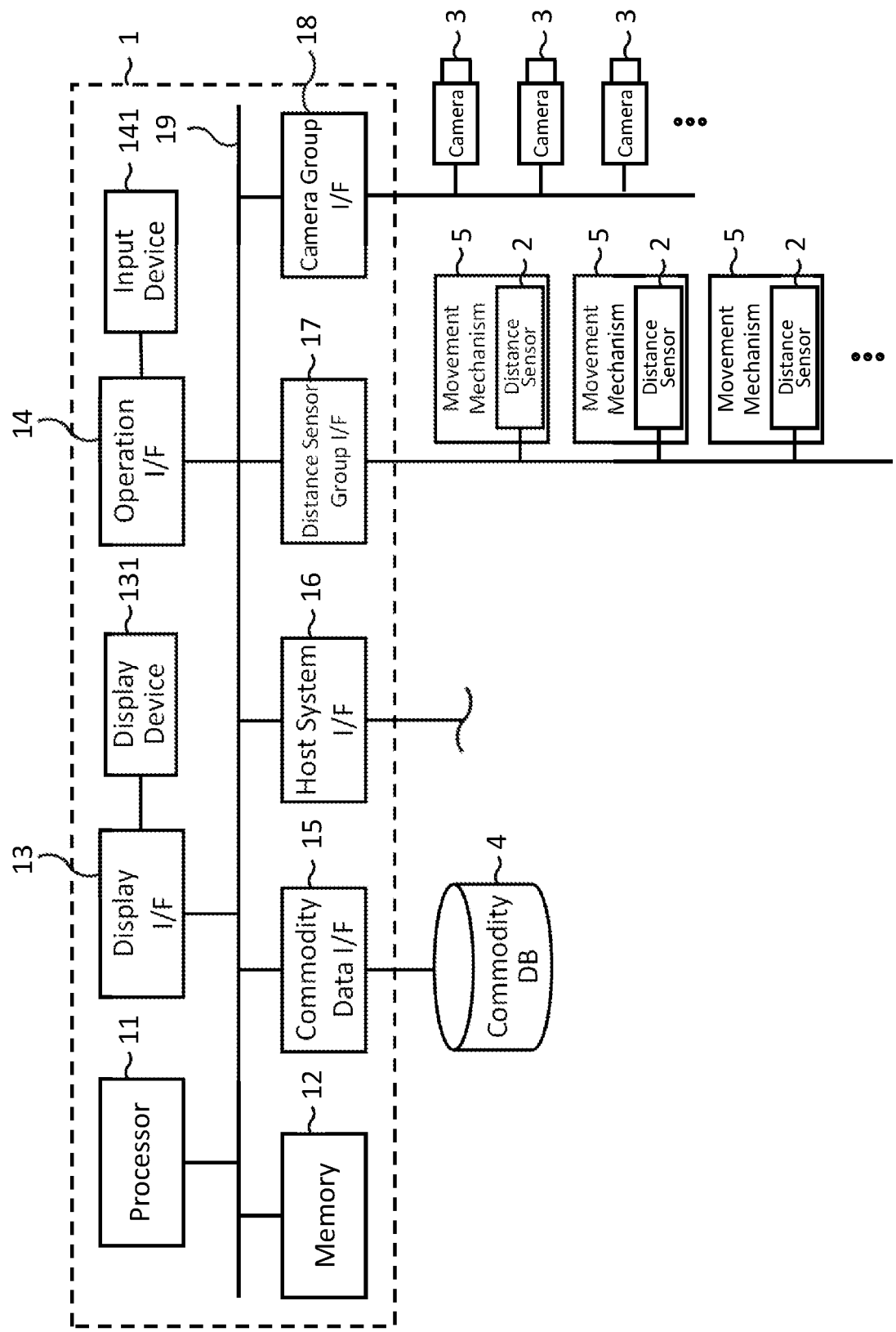
FIG. 1 is a hardware block diagram of a commodity management system including a commodity management device according to an embodiment.

FIG. 1 is a hardware block diagram of a commodity management system including a commodity management device 1 provided in a store according to an embodiment. The commodity management system includes a plurality of distance sensors 2, a plurality of cameras 3, and a commodity database (DB) 4 in addition to the commodity management device 1. Each distance sensor 2 is provided in a movement mechanism 5.

The commodity management device 1 includes a processor 11, a memory 12, a display interface (I/F) 13, an operation interface 14, a commodity data interface 15, a host system interface 16, a distance sensor group interface 17, a camera group interface 18, and a system transmission path 19. In addition, although not particularly illustrated, a clock circuit that outputs the current date and time is provided. The processor 11, the memory 12, the display interface 13, the operation interface 14, the commodity data interface 15, the host system interface 16, the distance sensor group interface 17, and the camera group interface 18 are each connected to the system transmission path 19. The system transmission path 19 is an address bus, a data bus, a control signal line, or the like. In the commodity management device 1 according to one embodiment, the processor 11 and the memory 12 make up a controller that performs information processing for controlling the commodity management device 1.

The display interface 13 is connected to a display device 131. The operation interface 14 is connected to an input device 141. The commodity data interface 15 is connected to the commodity database 4. The distance sensor group interface 17 is connected to a plurality of distance sensors 2. The camera group interface 18 is connected to a plurality of cameras 3.

The processor 11 of the commodity management device 1 controls each unit to perform various functions as the commodity management device 1 according to an operating system or an application program(s). The processor 11 is, for example, a central processing unit (CPU).

The memory 12 includes a nonvolatile memory area and a volatile memory area. The nonvolatile memory area stores the operating system or the application programs. The volatile memory area stores data necessary for the processor 11 to execute processing for controlling each unit. For example, the memory 12 stores an association table to be described later. The processor uses the volatile memory area of the memory 12 as a work area in which data is temporarily stored. The nonvolatile memory area is, for example, a ROM (Read Only Memory). The non-volatile memory area is a known storage device such as an EEPROM (an electric erasable programmable read-only memory), an HDD (a hard disc drive), or an SSD (a solid state drive) or any combination thereof. The volatile memory area is, for example, a RAM (Random Access Memory).

FIG. 2 is a diagram illustrating a record of an association table 121 stored in the memory 12. Each record stores a distance sensor ID, a camera ID, a commodity code, and thickness information in association with an area ID. The association table 121 provides tabular data indicating which commodities are displayed at which display positions on which commodity display shelves in the store. Such data can be utilized to generate a planogram, which can be a representation (e.g., a visual schematic) of the store's displayed product inventory.

Here, the area ID is a unique identification code set for each display area in order to identify a display position of a commodity display shelf on which one or more commodities are displayed. Therefore, the association table 121 includes the predetermined number of records corresponding to the number of display areas in all display shelves in the store. The number of records in the association table 121 increases or decreases in accordance with an increase or decrease in the number of display shelves, an increase or decrease in the number of individual shelves on each display shelf unit, and the setting of the display areas on each shelf.

The distance sensor ID is a unique identification code for identifying each distance sensor 2. As will be described later, since the distance sensor 2 is installed for each display area, the area ID and the distance sensor ID correspond one-to-one.

The camera ID is a unique identification code for identifying each camera 3. Since a camera 3 is installed for each display area, similarly to the case of each distance sensor 2, the area ID and the camera ID correspond to each other in one-to-one relationship.

The commodity code is a unique identification code for identifying each commodity. The commodity code stored in the association table 121 indicates the particular commodity type displayed in the display area that is specified by the area ID. Therefore, the commodity code of each record of the association table 121 can be updated each time the commodity displayed in the display area is changed. As such, a planogram generated from the association table 121 data can likewise be updated to reflect changes in displayed commodities.

The thickness information is size information of a commodity indicated by the commodity code. When a commodity is displayed, the size of the commodity in the left-right or horizontal direction, the up-down or vertical direction, and the depth direction in the display area varies depending on which surface is directly opposed to a customer. The thickness information is size information in the depth direction according to the display form of the commodity. Therefore, the thickness information of each record in the association table 121 is updated each time the commodity displayed in a display area (corresponding to a particular area ID) is changed.

The display interface 13 is an interface for the processor 11 to transmit display data to the display device 131. The display device 131 may be a liquid crystal display or an organic EL display. The processor 11 controls the display device 131 via the display interface 13 to display various kinds of information based on the display data.

The operation interface 14 is an interface for the processor 11 to receive input data from the input device 141. The input device 141 is a keyboard, a mouse, or the Like. The input device 141 may be a touch panel disposed on the display screen of the display device 131. Input data corresponding to an operation performed by the input device 141 is acquired by the processor 11 via the operation interface 14. The input device 141 can be used, for example, to give the processor 11 instructions for image capture and end instructions, as described below.

The commodity data interface 15 is an interface for the processor 11 to access the commodity database 4. The processor 11 acquires information on a commodity from the commodity database 4 via the commodity data interface 15. In FIG. 1, the commodity database 4 is stored outside of the commodity management device 1, but it may be stored in the memory 12 of the commodity management device 1. The commodity database 4 stores commodity information in association with a commodity code of each commodity. For example, the commodity information is feature data of the commodity (e.g., feature points on each surface of the commodity) and a plurality of pieces of size information corresponding to the display form. For example, when a commodity has a rectangle shape, the size information indicates three dimensions of the commodity.

The host system interface 16 is an interface for the processor 11 to exchange data with a host system (not shown) such as a checkout system or a store system. The processor 11 controls the host system interface 16 to transmit data to the host system and receives data from the host system. The host system interface 16 may be a wired or wireless communication interface. By doing so, the processor 11 can perform data communication with other devices connected to a LAN (network such as a local area network) or the Internet via the host system interface 16.

The distance sensor group interface 17 is an interface for the processor 11 to exchange data with the plurality of distance sensors 2. The distance sensor 2 has a built-in memory and can hold distance data for a predetermined time. When such a distance sensor 2 is used, the processor 11 inquires of the distance sensor 2 about the distance via the distance sensor group interface 17, and the distance sensor 2 returns the presence or absence of a distance change and distance data in response to the inquiry. The distance data in this case is a current distance, distances before and after a change, or an amount of a distance change. The distance sensor 2 may spontaneously output distance data together with a distance change notification when there is a distance change. Further, the distance sensor 2 may not have a built-in memory and simply output measurement data indicating the distance at that time as distance data. In the following embodiments, it is assumed that the distance sensor 2 returns distance data including the presence or absence of a distance change and the amount of the distance change in response to an inquiry from the processor 11.

The camera group interface 18 is an interface for the processor 11 to acquire photograph data from each of the plurality of cameras 3.

Hereinafter, an arrangement relationship between the plurality of distance sensors 2 and the plurality of cameras 3 in a commodity shelf on which various commodities are displayed will be described.

Figure 3:
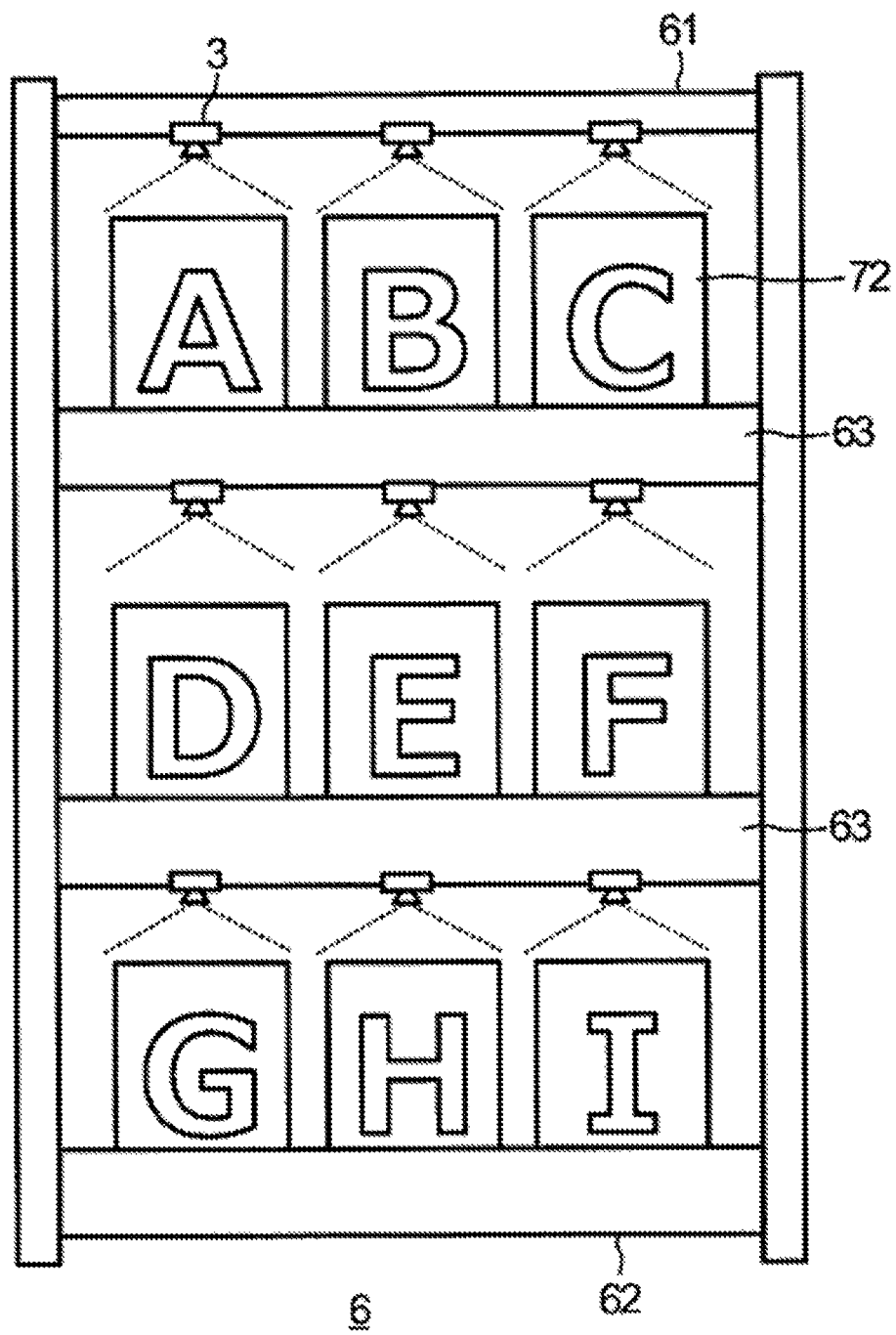
FIG. 3 depicts a commodity display shelf on which various commodities are displayed as viewed from the front side.
Figure 4:
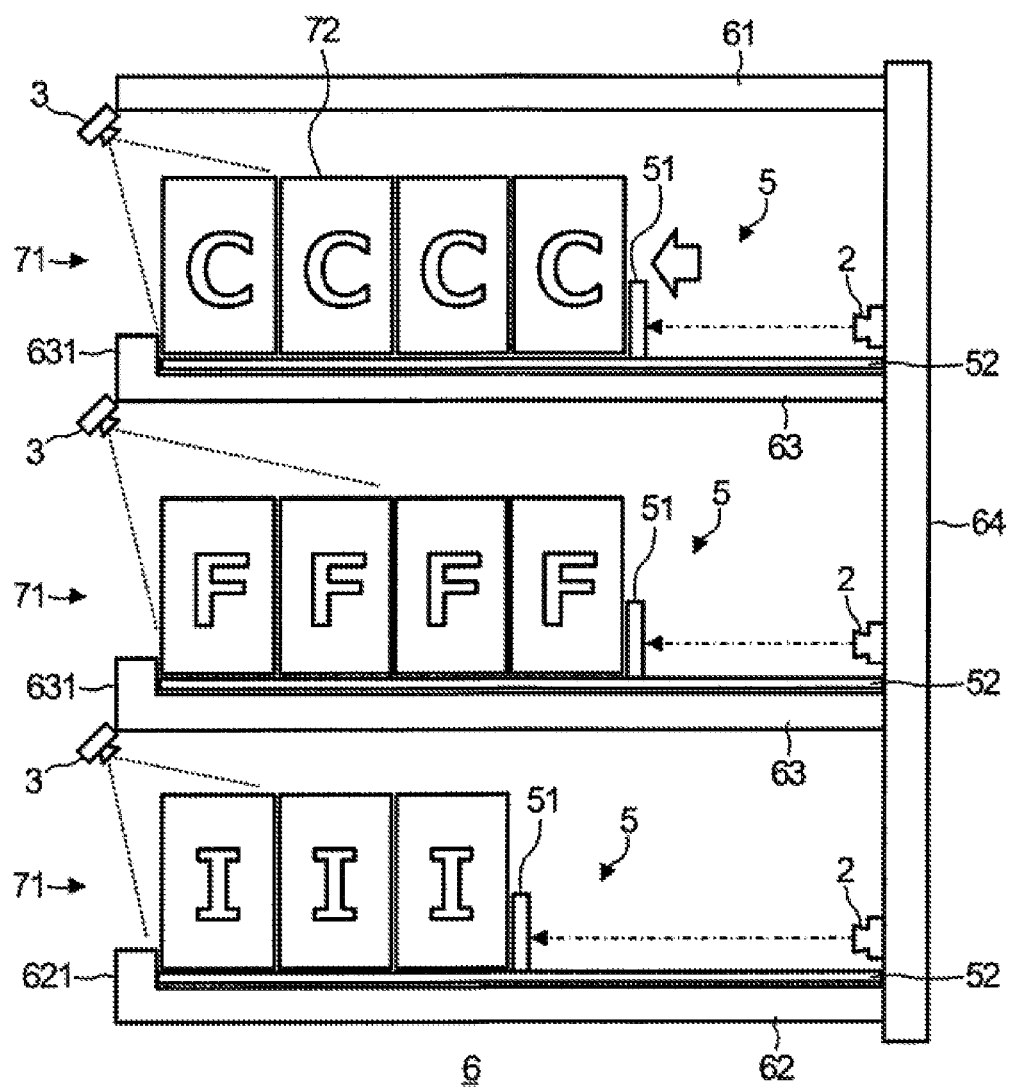
FIG. 4 is a schematic diagram of a commodity display shelf viewed from a lateral direction through a side plate.

FIG. 3 is a schematic diagram of a commodity shelf 6 viewed from the front side, and FIG. 4 is a schematic diagram of the commodity shelf 6 viewed from the lateral direction through the side plate. In FIGS. 3 and 4, the shelf 6 having a three-stage configuration in which a top plate 61 and a bottom plate 62 are partitioned by two shelf plates 63. Each stage is divided into three display areas, left, right, and center. Each display area extends in the depth direction of the bottom plate 62 and the shelf plate 63. In one display area, one type of commodities 72 are displayed side by side along a commodity row 71.

In each display area for displaying the commodities 72, a movement mechanism 5 that automatically moves the commodities 72 towards the front side along the commodity row 71 (i.e., the depth direction) is disposed. Hereinafter, the front side is referred to as a first end side. The movement mechanism 5 has a pressure plate 51 for pressing the commodity 72 displayed in the display area toward the first end side. The movement direction of the pressure plate 51 is regulated by a rail 52, and the pressure plate 51 slides between the first end side of the display area and a second end side opposite to the first end side. The pressure plate 51 is biased toward the first end side by a biasing member (not shown) such as a spring, and presses the commodities 72 arranged along the commodity row 71 toward the first end side by the biasing force. End portions of the bottom plate 62 and the shelf plate 63 on the first end side form stoppers 621 and 631. The stoppers 621 and 631 restrict the movement of the foremost, i.e., closest to the first end side, commodity 72 biased towards the first end. In this way, the movement of the commodity 72 closest to the first end side in the first end side direction is restricted by the stopper 621 or 631, and the commodity 72 closest to the second end side is pressed in the first direction by the pressure plate 51. As a result, the commodities 72 in the commodity row 71 are arranged without gaps.

The distance sensor 2 measures, for each display area, a distance from the commodity 72 located on the second end side opposite to the first end side in the depth direction to a reference position in the commodity row 71 displayed in each display area. The reference position is, for example, the position of the back plate 64 of the commodity shelf 6. Therefore, the distance sensor 2 is attached to the back plate 64 for each display area. The distance sensor 2 measures a distance to the commodity 72 by using light such as ultrasonic waves, laser light, or infrared light, for example, as indicated by dashed lines in FIG. 4.

The camera 3 is also attached to each of the top plate 61 and the shelf plate 63 of the commodity shelf 6 for each display area so as to photograph the commodity 72 on the first end side. The camera 3 is, for example, a CCD (Charge Coupled Device) camera. The attachment position and the attachment angle of the camera 3 are not particularly limited as long as at least the commodity 72 located on the first end side can be photographed.

Figure 5:
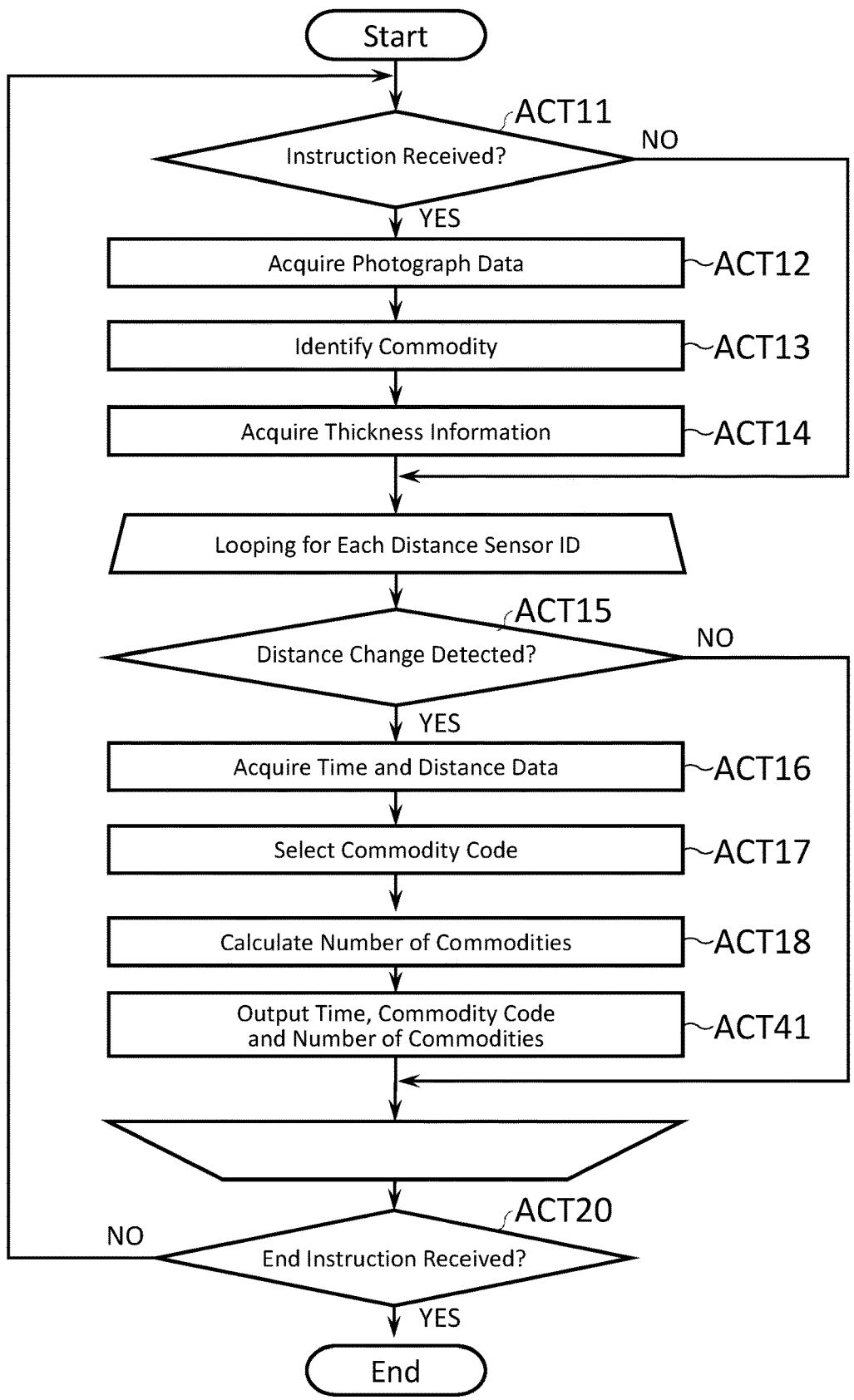
FIG. 5 is a flowchart of control procedure performed by a commodity management device according to an embodiment.

FIG. 5 is a flowchart of a control procedure performed by the commodity management device 1. Hereinafter, the operation of the commodity management apparatus 1 will be described with reference to FIG. 5. The procedure and contents of the operation described below are merely examples. One or more steps may be added or omitted as long as similar results can be obtained.

First, the processor 11 determines whether an instruction for image capture has been received from the input device 141 via the operation interface 14 (ACT11). A user of the commodity management device 1, such as a store clerk, can operate the input device 141 to generate the instruction for image capture after the display position of a commodity 72 is changed. Here, in a case where the instruction for image capture is not received (NO in ACT11), the processor 11 proceeds to a loop process for each distance sensor ID for the detection of removal of a commodity 72 and calculation of the number of the removed commodities 72 as described below.

On the other hand, when an instruction for image capture is received (YES in ACT11), the processor 11 acquires photograph data from the cameras 3 via the camera group interface 18 and temporarily stores the photograph data in the memory 12 (ACT12).

Figure 6:
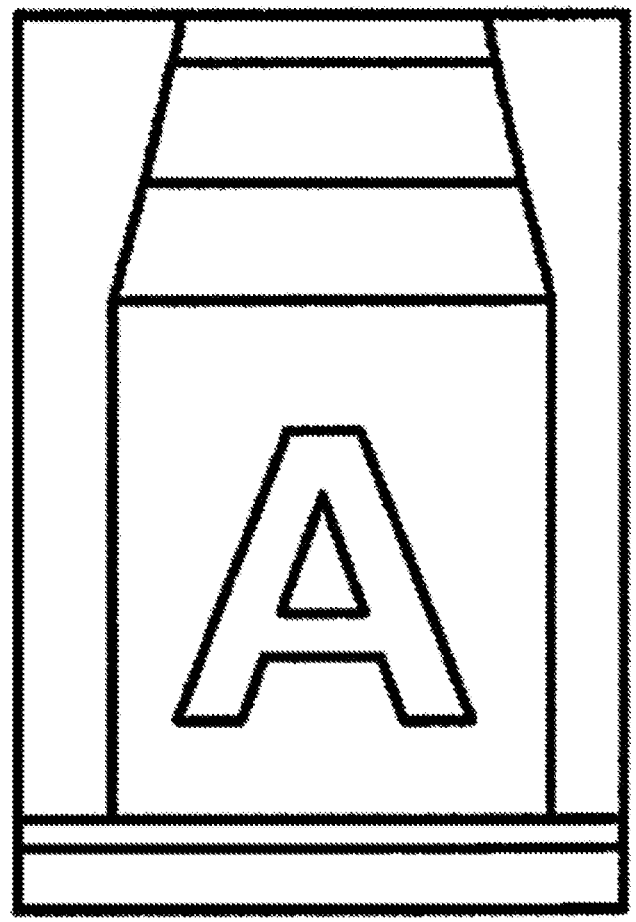
FIG. 6 is a schematic diagram of photograph data captured by a camera.

Next, the processor 11 identifies the commodity 72 of the commodity row 71 displayed in the corresponding display area from the acquired photograph data (ACT13). FIG. 6 is a schematic diagram showing photograph data from the camera 3. For example, the processor 11 performs known image recognition on the photograph data to acquire feature data (or extract feature points) of the commodity 72. Then, the processor 11 searches the commodity database 4 using the feature data through the commodity data interface 15, and specifies the commodity having same or similar feature data. Any method, such as machine learning, can be used to identify a commodity based on photograph data. The processor 11 stores the commodity ID of the commodity specified in this way in the record of the association table 121 in which the camera ID of the camera 3 that has acquired the photograph data is stored. As described above, the association table 121 stores the distance sensor ID and the camera ID in association with each other.

In addition, the processor 11 detects the direction towards which a commodity faces when identifying the commodity. For example, when the commodity has a rectangular shape, the commodity database 4 stores feature data corresponding to each of the six surfaces of the commodity, that is, front, rear, left, right, upper, and lower surfaces. Therefore, when the commodity in the photograph data is identified, it is possible to identify not only the commodity but also which face of the commodity is photographed by the camera 3. The processor 11 acquires size information, that is, thickness information of each commodity 72 in the depth direction of the display area from the commodity database 4 based on the identification result (ACT14). Then, the processor 11 stores the acquired thickness information in the record of the association table 121 in which the camera ID of the camera 3 that has acquired the photograph data is stored.

As described above, the association table 121 is updated.

After the end of the process of ACT14, or when the instruction for image capture is not received (NO in ACT11), the processor 11 performs the following looping process for each distance sensor ID. In this loop process, for each distance sensor ID (that is, for each display area associated with a distance sensor ID) the detection of the removal of a commodity 72 and the calculation of the number of removed commodities 72 are performed. This loop processing is performed for all the distance sensor IDs.

First, the processor 11 makes an inquiry to the distance sensor 2 indicated by the distance sensor ID via the distance sensor group interface 17. Then, the processor 11 determines whether or not a response indicating that a distance change is detected from the distance sensor 2 (ACT15).

In a case where a response indicating that a distance change is not detected (NO in ACT15), the processor 11 waits until the loop process for the other distance sensor IDs is completed.

On the other hand, when a response indicating that a distance change is detected from the distance sensor 2 (YES in ACT15), the processor 11 acquires distance data indicating the amount of the distance change from the distance sensor 2, acquires the time when the distance change has occurred, and temporarily stores them in the memory 12 (ACT16). The time of the distance change can be acquired by the clock circuit (not shown).

Next, the processor 11 selects the commodity code and the thickness information of the commodity 72 of the commodity row 71 displayed in the display area corresponding to the distance sensor ID from the association table 121 (ACT17).

Then, the processor 11 calculates the number of removed commodities 72 by dividing the amount of the distance change acquired in ACT 16 by the thickness indicated by the selected thickness information (ACT18).

Figure 7:
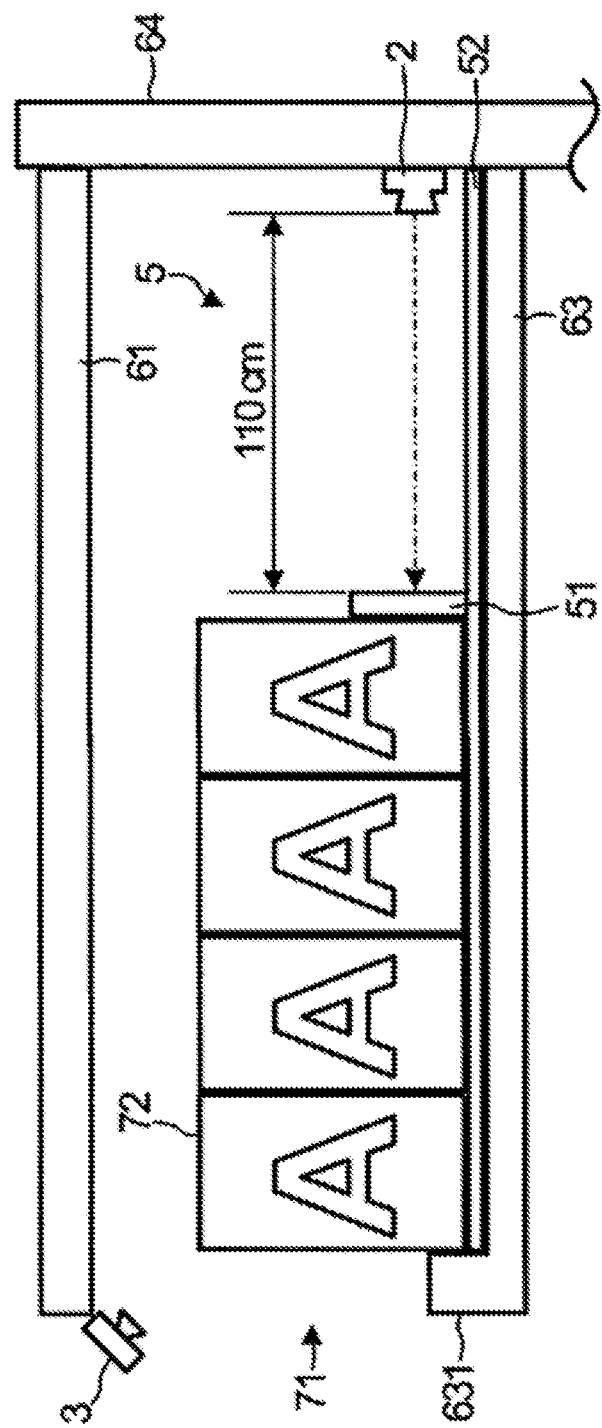
FIG. 7 is a schematic diagram of a line of commodities.
Figure 8:
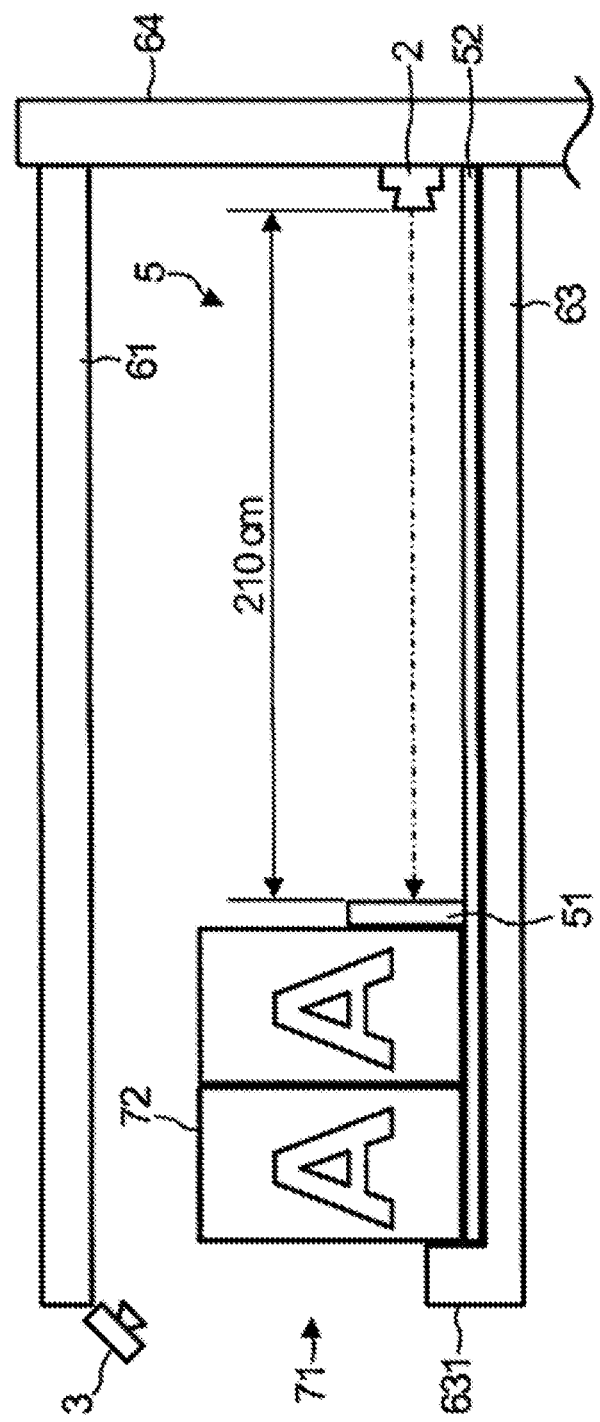
FIG. 8 is a schematic diagram of a line of commodities after some have been taken.

For example, it is assumed that the size of three sides of a certain commodity 72 is 100 cm×150 cm×50 cm. For example, 50 cm corresponds to size information in the depth direction of the commodity 72, that is, thickness information. FIG. 6 shows photograph data acquired by photographing the commodity row 71 for displaying the commodities 72 from the front side. FIG. 7 shows the commodity row 71 before some commodities 72 have been removed, and FIG. 8 shows the commodity row 71 after the commodities 72 have been removed. As illustrated in FIG. 7, it is assumed that the distance sensor 2 measures the distance of 110 cm in a state where four commodities 72 are displayed on the shelf plate 63 of the commodity shelf 6 before having been removed. After the commodities 72 have been removed, the distance measured by the distance sensor 2 is changed to 210 cm. In such a case, the amount of the distance change is 210 cm−110 cm=100 cm. On the other hand, the thickness of the commodity 72 determined from the photograph data of the camera 3 is the depth size 50 cm. Therefore, the processor 11 can calculate 100 cm/50 cm=2 and determine that the number of removed commodities 72 is two.

Figure 9:
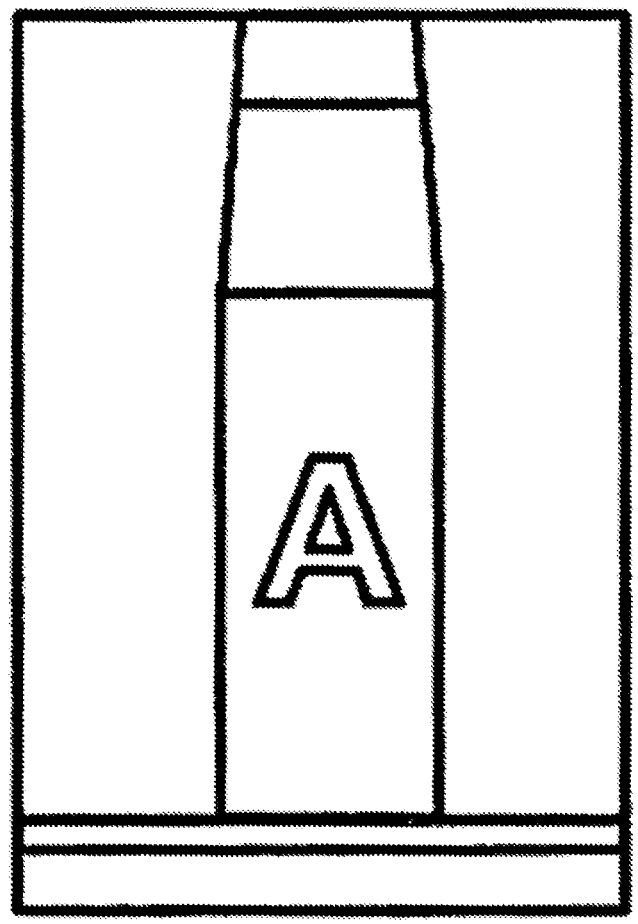
FIG. 9 is a schematic diagram of photograph data captured by a camera.
Figure 10:
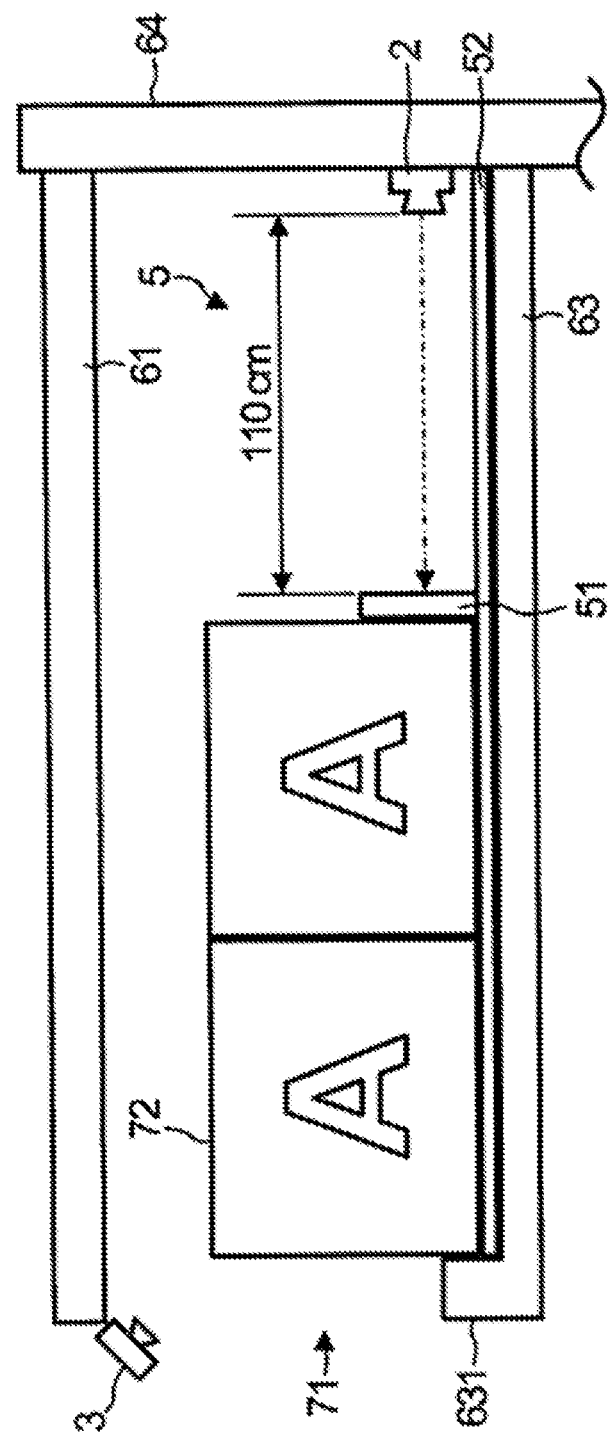
FIG. 10 is a schematic diagram of a line of commodities.
Figure 11:
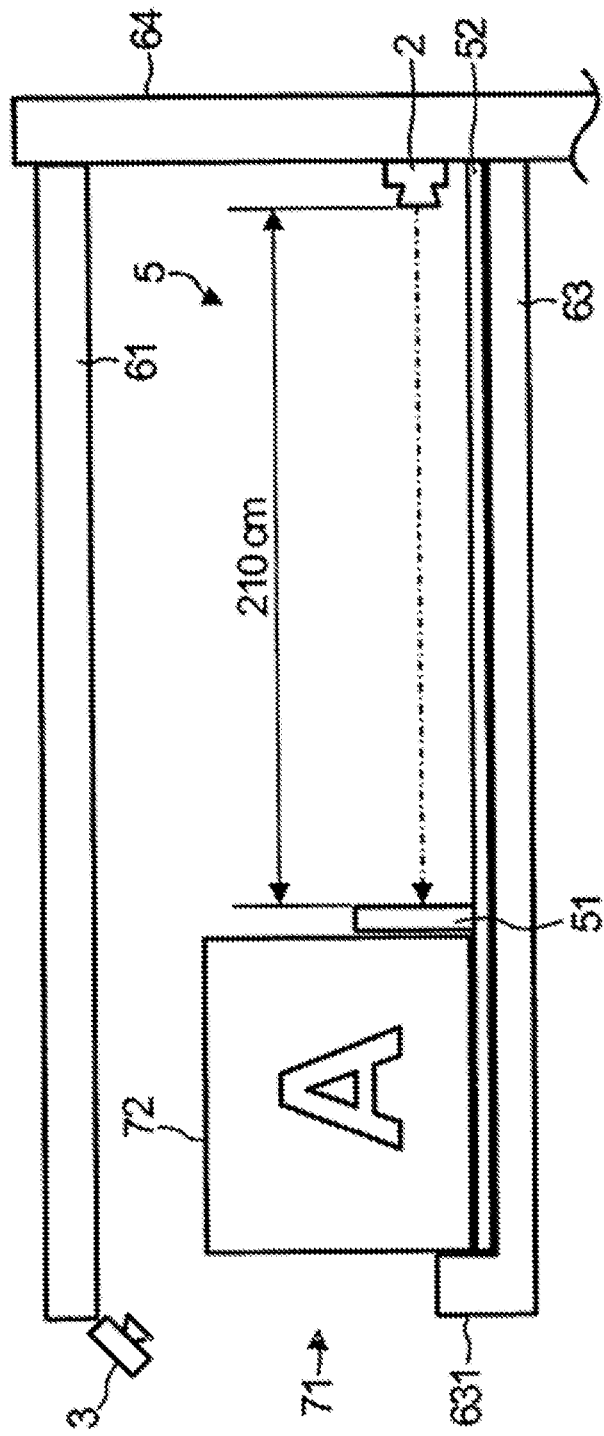
FIG. 11 is a schematic diagram of a line of commodities after one has been taken.

FIGS. 9 to 11 show a case where the commodities 72 are displayed side by side in a different orientation. That is, FIG. 9 is a schematic diagram showing photograph data captured by the camera 3, FIG. 10 is a schematic diagram showing the commodity row 71 before the commodity 72 is removed, and FIG. 11 is a schematic diagram showing the commodity row 71 after the commodity 72 has been removed. Here, the commodities 72 are arranged along the commodity row 72 such that the thickness is 100 cm. In such a case, the distance change acquired by the sensor is 100 cm, and the thickness information about the commodity 72 indicates 100 cm. Therefore, the processor 11 can calculate 100 cm/100 cm=1 and determine that the number of removed commodities 72 is one.

When the number of the removed commodities is calculated as described above, the processor 11 outputs the time information indicating the time when the distance change occurred, the commodity code of the extracted commodity 72, and the number information indicating the calculated number to the host system via the host system interface 16 (ACT19).

When the processes of ACT15 to ACT19 are performed for all the distance sensor IDs, the processor 11 ends the loop process for each distance sensor ID.

Then, the processor 11 determines whether an end instruction has been received from the input device 141 via the operation interface 14 (ACT20). A user of the commodity management device 1, such as a store clerk, can operate the input device 141 to input the end instruction. Accordingly, for example, when the display position of a commodity 72 is changed, the operation of the commodity management device 1 can be temporarily stopped. Here, if the end instruction is not received (NO in ACT20), the processor 11 returns to the process of ACTT. When the end instruction is received (YES in ACT20), the processor 11 ends the operations.

In the commodity management device 1, the processor 11 acquires photograph data from the cameras 3 positioned to photograph the first end side of the commodity shelf 6 having the movement mechanism 5 that moves the commodities 72 along the depth direction towards the first end side. In addition, the processor 11 acquires distance data from the distance sensors 2 that measure, for each display area, the distance from the commodity 72 positioned on the second end side opposite to the first end side in the depth direction to the reference position in each display area of the commodity shelf 6. Then, the processor 11 identifies the commodity 72 that has been removed from the display area for which the distance change has occurred based on the acquired photograph data and distance data. In addition, the processor 11 acquires thickness information (which is a size in the depth direction of the identified commodity 72) from the association table 121 of the commodity database 4. Then, the processor 11 calculates the number of commodities 72 that have been removed from the particular display area of the commodity shelf 6 for which the distance change has occurred, based on the acquired size information for the commodities 72 and the acquired distance data.

Therefore, the processor 11 of the commodity management device 1 can identify the commodity 72 removed from the commodity shelf 6 and also detect the number of the commodities 72 removed from the commodity shelf 6.

In addition, the processor 11 acquires photograph data from cameras 3 in response to an instruction to identify the commodity 72 displayed in the commodity row 71 of each display area of the commodity shelf 6. Such instruction can be issued in response to a change in positions of the commodities 72 made on a planogram (a visual schematic of displayed inventory positions) or otherwise. The processor 11 identifies a commodity 72 based on the acquired photograph data, then associates a distance sensor ID of a distance sensor 2 with the commodity code for the identified commodity 72 in the association table 121.

In order to identify the commodities 72 that have been removed from the commodity shelf 6 and detect the number of commodities, the display locations for each commodity 72 is required to be known beforehand. However, when the display positions of commodities 72 are changed or rearranged on the store display shelves (by a store clerk or otherwise), any previously stored information regarding commodity display locations may become outdated. In view of this, problem, it is conventionally necessary to manually input commodity display location to update stored display location data. In contrast, in the present embodiments, when a commodity display location change is made, the processor 11 can automatically update the previously stored commodity display location data based on the photograph data from the cameras 3. Such an update can be performed simply by inputting an instruction via the input device 141 or otherwise.

In such a case, the processor 11 acquires thickness information of the newly identified commodity 72 from the commodity database 4, and registers the distance sensor ID, the commodity code, and the thickness information in the association table 121 in association with each other. In this way, the processor 11 can acquire the size information of the commodity 72 and automatically update the stored commodity display location data (which may be represented as a planogram). Then, when the processor 11 later specifies a commodity 72 and acquires the thickness information for the commodity 72 by reference to a distance sensor ID, the commodity code and the thickness information are appropriately associated with each other in the association table 121.

Additionally, the processor 11 determines the display form of the commodity 72 in the commodity row 71 based on the acquired photograph data, and acquires size information in the depth direction corresponding to the determined display form from the commodity data base 4.

That is, the size information in the depth direction differs depending on the orientation of the displayed commodity 72. The processor 11 can determine the display orientation of the commodity 72, acquire size information corresponding to the orientation, and register the size information as thickness information in the association table 121.

Although the embodiments of the commodity management device 1 in the commodity management system capable of identifying commodities 72 that have been removed from the commodity shelf 6 and detecting the number of the removed commodities 72 has been described above, the embodiments are not limited thereto.

Figure 12:
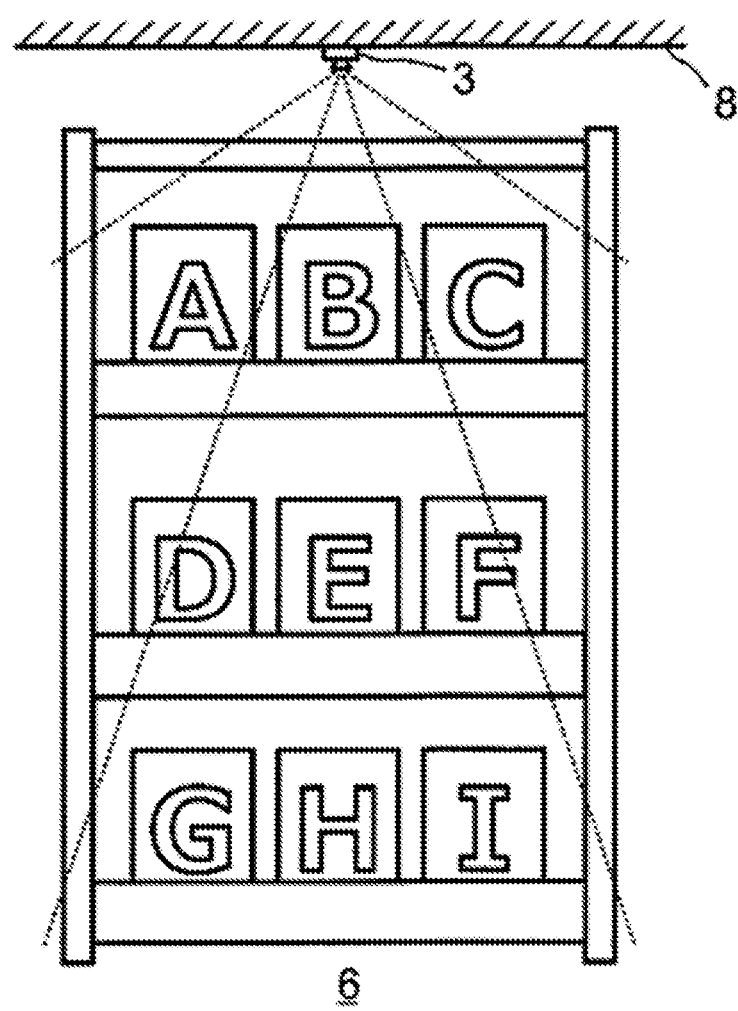
FIG. 12 is a schematic diagram of a commodity display shelf according to an embodiment as viewed from the front side.
Figure 13:
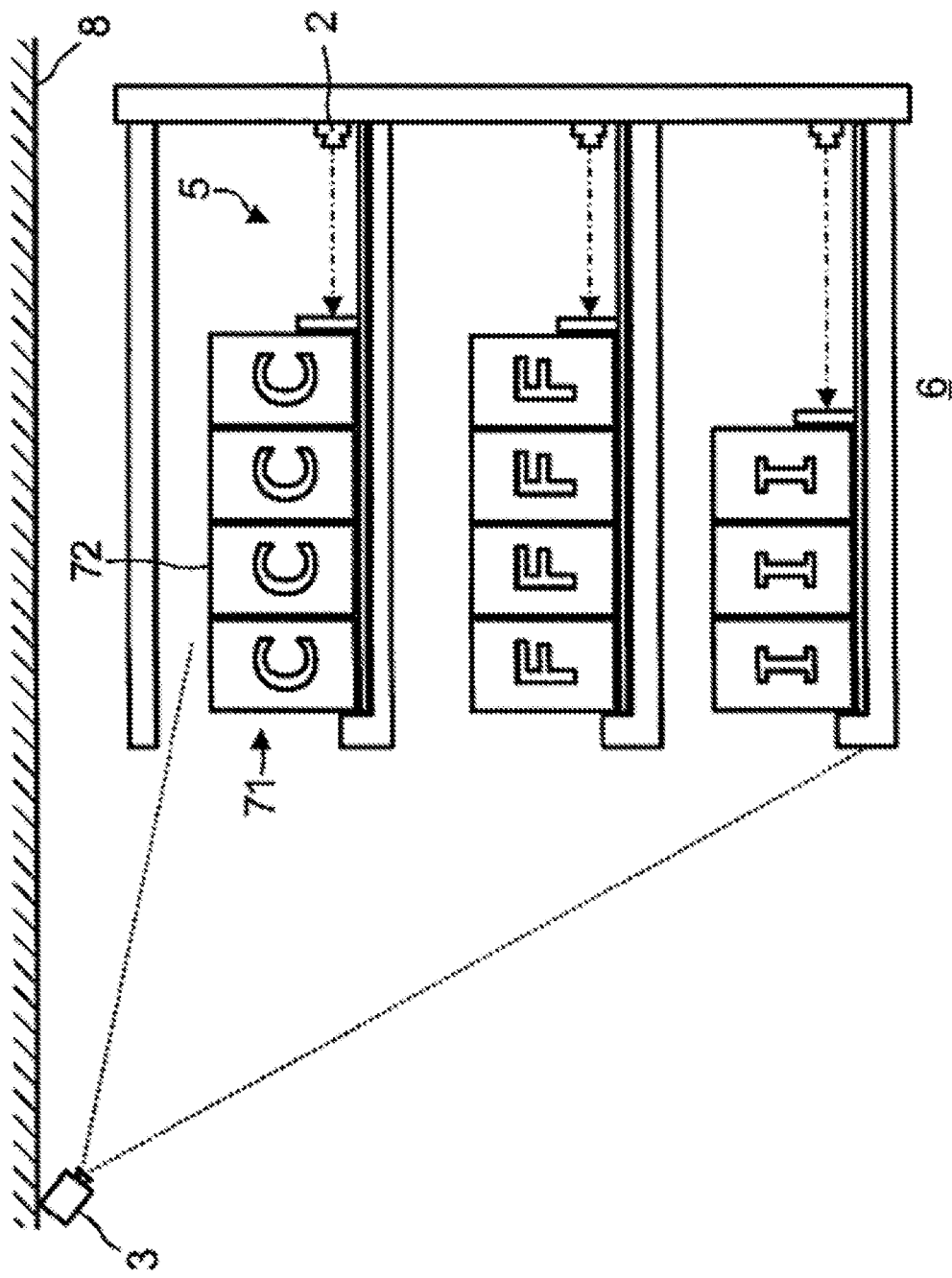
FIG. 13 is a schematic diagram of a commodity display shelf according to an embodiment viewed from a lateral direction through a side plate.

FIG. 12 is a schematic diagram of a commodity shelf 6 according to an embodiment as viewed from the front side, and FIG. 13 is a schematic diagram of the commodity shelf 6 as viewed from the lateral side through the side plate. Here, instead of providing a plurality of cameras 3 for each display area, only one camera 3 is attached to a ceiling 8. The attachment position and the attachment angle of the camera 3 are adjusted so that the camera 3 captures the entire display area of the commodity shelf 6. In such a case, one camera ID is associated with the plurality of area IDs and the distance sensor IDs in the association table 121 of the memory 12. By known image recognition techniques, the processor 11 can determine the relationships between the display positions on the commodity shelf 6 and the commodities 72 from one photograph.

Figure 14:
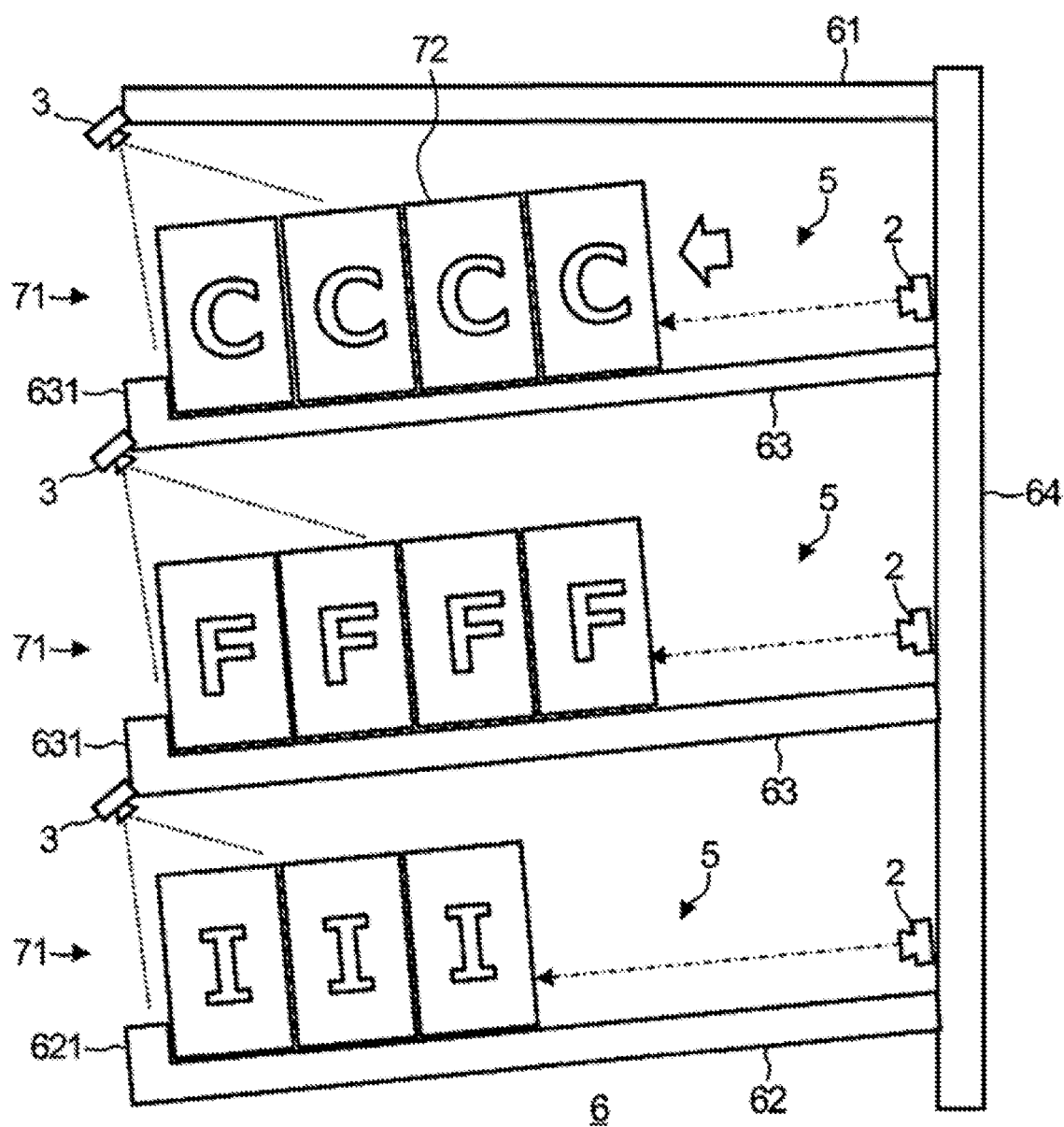
FIG. 14 is a schematic diagram of a commodity display shelf according to an embodiment viewed from a lateral direction through a side plate.

In addition, various configurations can be used for the movement mechanism 5 that automatically moves commodities 72 displayed in each display area along the commodity row 71. FIG. 14 is a schematic diagram of a commodity shelf 6 according to an embodiment viewed from the lateral side through a side plate. As described above, the movement mechanism 5 may be an inclined bottom plate 62 and an inclined shelf plate 63. By providing the inclination in the commodity display area, the commodity 72 is moved forward by its own weight.

Further, in the above-described embodiments, the distance sensor 2 is of a type that outputs distance data including the presence or absence of a distance change and the amount of the distance change in response to the inquiry from the processor 11. However, other types of distance sensors 2 can be used. For example, a distance sensor 2 that does not have a built-in memory and simply outputs measurement data continuously indicating the distance as distance data may be used. In such a case, an area for storing the distance data present distance data to previous distance data can be provided in the association table 121 or otherwise in the memory 12. Then, the processor 11 periodically acquires distance data from each distance sensor 2, and stores the acquired distance data in the provided area. At the time of the storage, the processor 11 can determine whether the distance has changed and the amount of the distance change by comparing the newly stored distance data to the previously stored distance data.

Furthermore, in the above-described embodiments, the processor 11 performs removal detection and calculates the number of the commodities 72 present for each distance sensor ID for all the different distance sensor IDs. However, in general, the processor 11 may calculate the number of commodities 72 presence only for the distance sensors 2 that have detected a distance change. In such a case, instead of a loop for each distance sensor ID as depicted in FIG. 5, the following processing would be performed. When distance sensor 2 is of a type that outputs distance data together with a distance change notification whenever there is a detected distance change, the processor 11 receives a distance change notification from the distance sensors 2 for which there has been a distance change detection, and then calculates the number of commodities 72 remaining (or alternatively removed) only for the distance sensor IDs sending a distance change notification.

In each of the embodiments, the number of commodities 72 removed from the commodity shelf 6 is calculated. However, if a customer returns a commodity 72 to its original display position, the number of returned commodities can also be calculated by the same configuration and process.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A commodity management device, comprising:
   a camera interface circuit connectable to a camera that is configured to capture an image of a first commodity in a commodity row that is arranged along a first direction from a back plate of a shelf to a front of the shelf;
   a sensor interface circuit connectable to a sensor that is attached to the back plate and configured to measure a distance from the back plate to a second commodity in the commodity row; and
   a processor configured to:
      detect a change in the distance measured by the sensor,
      identify the first commodity based on the captured image and acquire a thickness in the first direction of the first commodity based on the identification of the first commodity, and
      calculate the number of commodities removed from the shelf based on the detected change in distance and the thickness of the first commodity.

2. The commodity management device according to claim 1, wherein the processor is further configured to:
   control the camera to capture the image of the first commodity,
   acquire a commodity ID for the first commodity based on the captured image, and
   associate a sensor ID for the sensor for the commodity row with the commodity ID.

3. The commodity management device according to claim 2, wherein the processor is further configured to store, in a memory, the commodity ID in association with the thickness of the first commodity.

4. The commodity management device according to claim 3, wherein the processor is further configured to acquire the sensor ID of the sensor when a change in the distance is detected by the sensor.

5. The commodity management device according to claim 1, wherein the processor is further configured to identify an orientation of the first commodity based on the captured image.

6. The commodity management device according to claim 5, wherein the thickness in the first direction of the first commodity is acquired based on the identified orientation.

7. The commodity management device according to claim 1, wherein the processor is further configured to acquire feature data from the captured image and compare the acquired feature data with feature data of pre-registered commodities to identify the first commodity.

8. The commodity management device according to claim 1, wherein the shelf has a mechanism that presses the second commodity along the commodity row in the first direction towards the front of the shelf.

9. The commodity management device according to claim 8, wherein the shelf has a protrusion at a front end thereof.

10. The commodity management device according to claim 1, wherein the camera is attached to an end of a top plate of the shelf.

11. A commodity management system, comprising:
a sensor attached to a back plate of a commodity display shelf and configured to measure a distance to a backmost commodity in a commodity row that is arranged along a first direction from the back plate to a front of the commodity display shelf; and
a commodity management device including:
a camera interface circuit connectable to a camera that is configured to capture an image of a frontmost commodity in the commodity row;
a sensor interface circuit connected to the sensor; and
a processor configured to:
detect a change in the distance measured by the sensor,
identify the frontmost commodity based on the captured image and acquire a thickness in the first direction of the frontmost commodity based on the identification of the frontmost commodity, and
calculate the number of commodities removed from the commodity display shelf based on the change in distance detected by the sensor and the thickness of the frontmost commodity.

12. The commodity management system according to claim 11, wherein the processor is further configured to:
control the camera to capture the image of the frontmost commodity,
acquire a commodity ID for the frontmost commodity based on the captured image, and
associate a sensor ID for the sensor with the commodity ID.

13. The commodity management system according to claim 12, wherein the processor is further configured to store, in a memory, the commodity ID in association with the thickness of the frontmost commodity.

14. The commodity management system according to claim 13, wherein the processor is further configured to acquire the sensor ID of the sensor when a change in the distance is detected by the sensor.

15. The commodity management system according to claim 11, wherein the processor is further configured to identify an orientation of the frontmost commodity based on the captured image.

16. The commodity management system according to claim 15, wherein the thickness in the first direction of the frontmost commodity is acquired based on the identified orientation.

17. The commodity management system according to claim 11, wherein the processor is further configured to acquire feature data from the captured image and compare the acquired feature data with feature data of pre-registered commodities to identify the frontmost commodity.

18. The commodity management system according to claim 11, wherein the commodity display shelf has a mechanism that presses the backmost commodity along the commodity row in the first direction towards the front of the commodity display shelf.

19. The commodity management system according to claim 18, wherein the commodity display shelf has a protrusion at a front end thereof.

20. A method for managing commodities displayed on a shelf, the method comprising:
capturing an image of a first commodity in a commodity row that is arranged along a first direction from a back plate of a shelf to a front of the shelf;
measuring a distance from the back plate to a second commodity in the commodity row using a sensor attached to the back plate;
detecting a change in the distance measured by the sensor;
identifying the first commodity based on the captured image and acquiring a thickness in the first direction of the first commodity based on the identification of the first commodity; and
calculating the number of the commodities removed from the shelf based on the detected change in distance and the thickness of the first commodity.

* * * * *